(12) United States Patent
Collins et al.

(10) Patent No.: US 9,587,710 B2
(45) Date of Patent: Mar. 7, 2017

(54) ADJUSTABLE DRIVE MECHANISM

(71) Applicant: Raytheon Company, Waltham, MA (US)

(72) Inventors: David C. Collins, Waltham, MA (US); Gordon O. Salmela, Waltham, MA (US); Jeffrey J. Farnum, Waltham, MA (US); Jonathan E. Casey, Waltham, MA (US)

(73) Assignee: Raytheon Company, Waltham, MA (US)

( * ) Notice: Subject to any disclaimer, the term of this patent is extended or adjusted under 35 U.S.C. 154(b) by 315 days.

(21) Appl. No.: 14/184,569

(22) Filed: Feb. 19, 2014

(65) Prior Publication Data

US 2015/0355452 A1   Dec. 10, 2015

(51) Int. Cl.
| | |
|---|---|
| *F16H 1/06* | (2006.01) |
| *F16H 1/26* | (2006.01) |
| *G02B 7/183* | (2006.01) |
| *F16H 57/12* | (2006.01) |

(52) U.S. Cl.
CPC ............ *F16H 1/06* (2013.01); *F16H 1/26* (2013.01); *F16H 57/12* (2013.01); *G02B 7/183* (2013.01); *F16H 2057/125* (2013.01); *Y10T 74/1955* (2015.01)

(58) Field of Classification Search
CPC .......... F16H 55/18; F16H 55/28; F16H 57/12; F16H 2057/125; H01Q 1/12; H01Q 1/125; H01Q 1/20; H01Q 1/18; B25B 23/0078; B25B 21/005; B25B 21/002; B25P 19/069

USPC ........ 74/31, 89.18, 395–401, 406, 409, 410; 81/57.24, 57.35, 57.36

See application file for complete search history.

(56) References Cited

U.S. PATENT DOCUMENTS

| | | | | |
|---|---|---|---|---|
| 3,110,474 A | * | 11/1963 | Circle, Jr. | ................ F16M 7/00 254/104 |
| 4,305,307 A | * | 12/1981 | Kiunke | ................... F16H 57/12 74/409 |
| 4,461,463 A | | 7/1984 | Okubo | |
| 4,655,548 A | | 4/1987 | Jue | |

(Continued)

FOREIGN PATENT DOCUMENTS

| | | | | |
|---|---|---|---|---|
| CH | 231753 A | * | 4/1944 | ............. B02C 17/24 |
| DE | 2103190 A1 | * | 8/1971 | ............. B63B 27/12 |

(Continued)

*Primary Examiner* — Terence Boes
*Assistant Examiner* — Bobby Rushing, Jr.

(57) ABSTRACT

An adjustable drive mechanism, which may be used to control the elevation angle of a telescope or antenna, is disclosed. The adjustable drive mechanism can include a base plate configured to couple with a support structure and having a first spherical portion facing away from the support structure. In addition, the adjustable drive mechanism can include a gear box having a pinion gear to interface with a driven gear of a telescope or antenna, and a housing in support of the pinion gear and including a second spherical portion configured to interface with the first spherical portion of the base plate. The first spherical portion and the second spherical portion can be movable relative to one another in three rotational degrees of freedom to facilitate alignment and positioning of the pinion gear relative to the driven gear.

18 Claims, 7 Drawing Sheets

(56) References Cited

U.S. PATENT DOCUMENTS

| | | | | |
|---|---|---|---|---|
| 6,152,243 | A * | 11/2000 | Junkers | B25B 23/0078 173/171 |
| 7,117,764 | B2 * | 10/2006 | Garric | B25B 21/002 81/57.39 |
| 8,016,438 | B2 | 9/2011 | Meyer et al. | |
| 8,585,292 | B2 * | 11/2013 | Boeing | F16C 23/02 384/260 |
| 8,816,923 | B2 * | 8/2014 | King | H01Q 1/088 343/766 |
| 9,182,030 | B2 * | 11/2015 | Morgan | F16H 57/02 |
| 2012/0312113 | A1 * | 12/2012 | Kastingschafer | F16C 13/04 74/380 |

FOREIGN PATENT DOCUMENTS

| | | | | |
|---|---|---|---|---|
| DE | 3237325 A1 * | 4/1984 | | B25B 17/02 |
| GB | 672274 A * | 5/1952 | | F16H 1/16 |

* cited by examiner

ADJUSTABLE DRIVE MECHANISM

GOVERNMENT LICENSE RIGHTS

This invention was made with government support under government contract F19628-02-C-0010 awarded by The United States Air Force. The government has certain rights in the invention.

BACKGROUND

Precision alignment of large power gear drives, such as for a telescope or antenna, typically requires three independent adjustments, one translation and two angular, to achieve full tooth contact and suitable backlash. Achieving the full capacity of a gear drive often requires milli-inch precision in the lead (helix) contact alignment, for each direction of rotation. Precision alignments are sometimes done by shimming between the foundation and the pinion gear housing. The radial adjustments are made using shims of different thicknesses to adjust the backlash (gaps) between the mating teeth. Lead or tilt adjustments can be made using tapered shims to tilt the pinion gear housing. Other designs have used an eccentric sleeve to permit center-to-center spacing adjustment to adjust backlash. Tilt adjustments can also be made by tilting a baseplate with jackscrews, then welding across the gaps between the baseplate and structure beneath.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
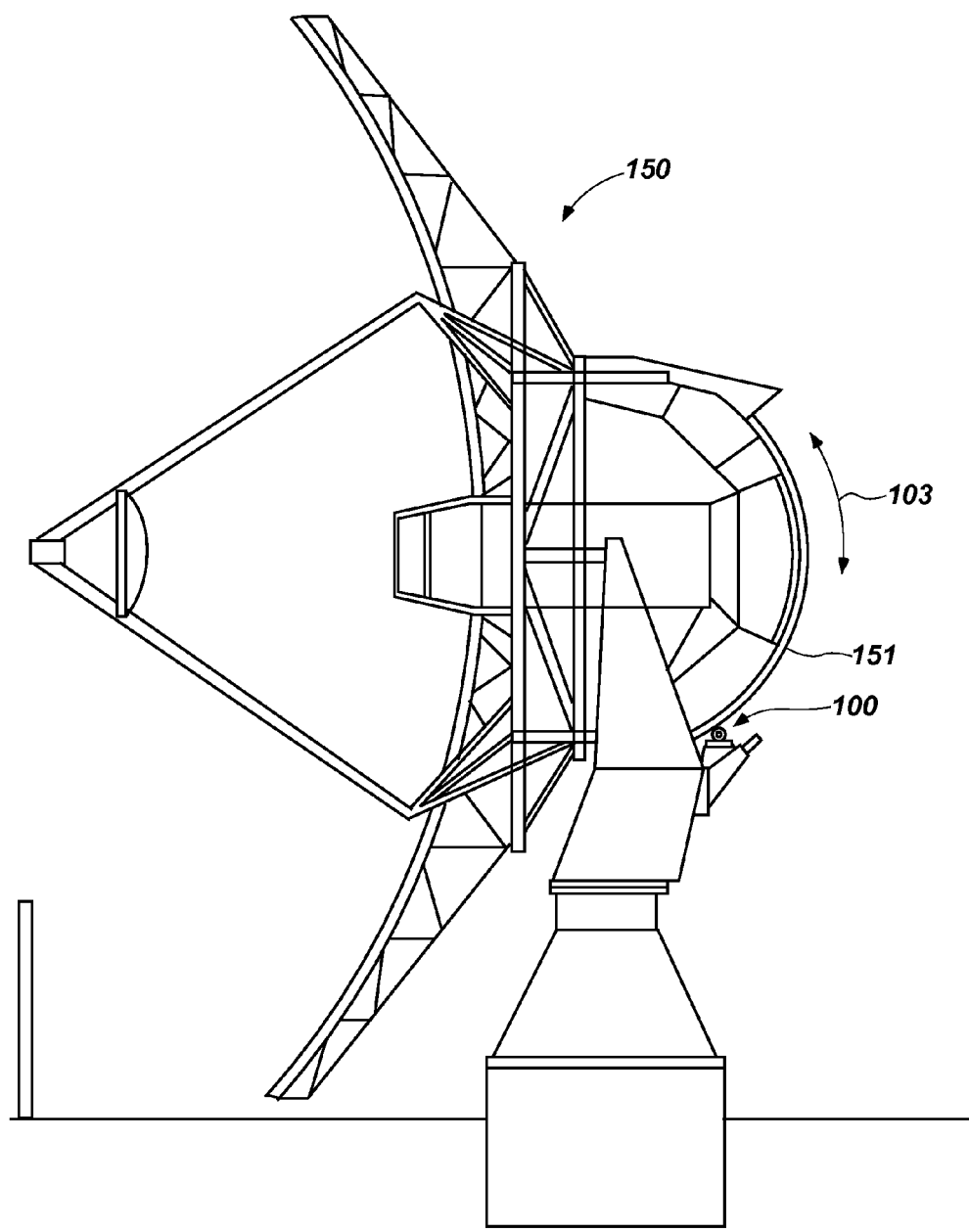
FIG. 1 is an example illustration of an adjustable drive mechanism for a telescope or antenna, in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although shims have been effectively utilized to achieve proper alignment of gears, the iterative nature of these adjustments makes them very time consuming. In addition, designs that utilize an eccentric sleeve only adjust backlash, and cannot correct tilt (rotation) errors. Furthermore, welding a baseplate that has been tilted by jackscrews makes subsequent adjustment or correction very difficult.

Accordingly, an adjustable drive mechanism is disclosed that incorporates continuous adjustment capabilities in all directions and axes. In one aspect, the invention provides a faster means of achieving a precision tooth alignment than prior devices, and can do so without the discrete steps imposed by the use of shims. The adjustable drive mechanism can include a base plate, configured to couple with a support structure, the base plate having a first spherical portion facing away from the support structure. In addition, the adjustable drive mechanism can include a gear box having a pinion gear to interface with a driven gear of a telescope or antenna, and a housing in support of the pinion gear and including a second spherical portion configured to interface with the first spherical portion of the base plate. The first spherical portion and the second spherical portion can be movable relative to one another in three rotational degrees of freedom to facilitate alignment and positioning of the pinion gear relative to the driven gear.

In addition, an adjustable drive mechanism securing system is provided. The system can include an adjustable drive mechanism. The adjustable drive mechanism can include a base plate configured to couple with a support structure and having a first spherical portion facing away from the support structure, and a gear box having a pinion gear to interface with a driven gear, and a housing in support of the pinion gear and including a second spherical portion configured to interface with the first spherical portion of the base plate. The first spherical portion and the second spherical portion can be movable relative to one another in three rotational degrees of freedom to facilitate alignment and positioning of the pinion gear relative to the driven gear. In addition, the gear box can be secured to the base plate with a plurality of fasteners. The system can also include a hydraulic or pneumatic wrench to apply a torque to the plurality of fasteners to alternately secure and release the gear box and the base plate. Additionally, the system can include a torque reaction tool operable with the adjustable drive mechanism and the wrench to react the torque applied by the wrench.

As illustrated in FIG. 1, an adjustable drive mechanism 100 can be used to control the elevation angle of a telescope or antenna 150. In general, the adjustable drive mechanism 100 includes a gear, such as a pinion gear, that interfaces with a driven gear 151, such as a bull gear, of the telescope or antenna 150. In some cases, the gearing will be un-housed or open. The drive mechanism can be driven by a motor to cause the telescope or antenna to rotate in direction 103 about a horizontal axis, thus changing the elevation angle of the telescope or antenna 150.

Figure 2:
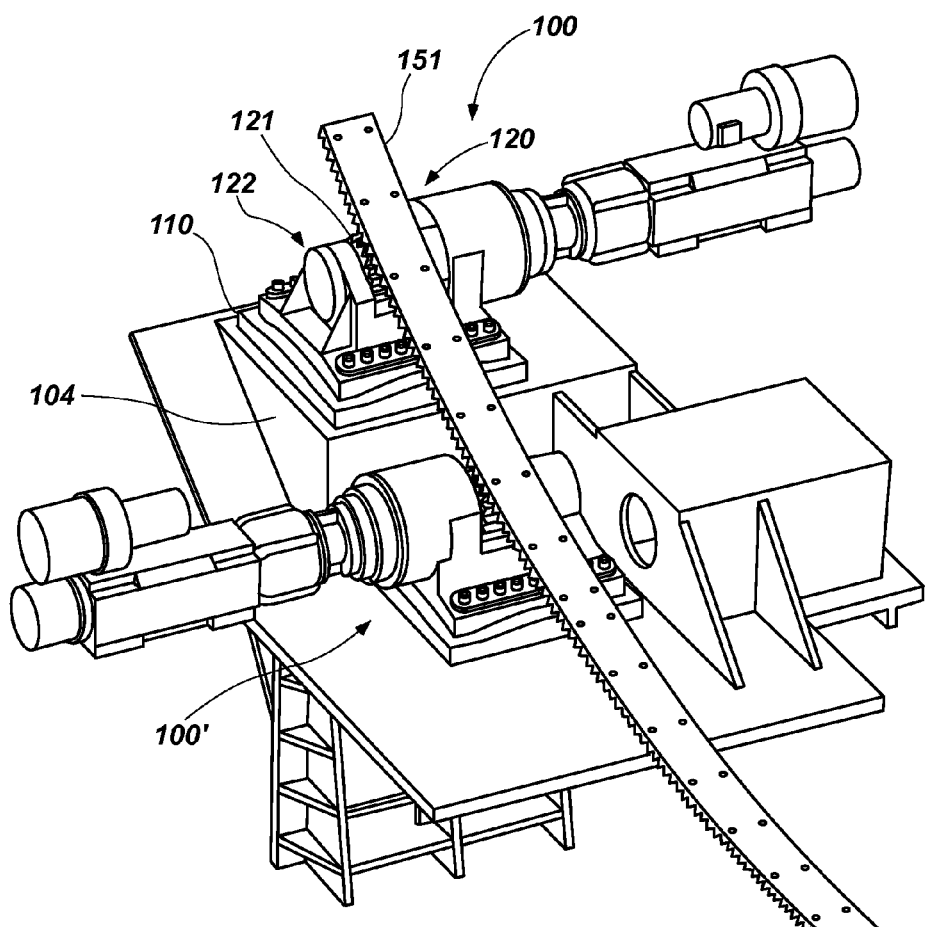
FIG. 2 is a close-up view of the adjustable drive mechanism of FIG. 1.
Figure 3:
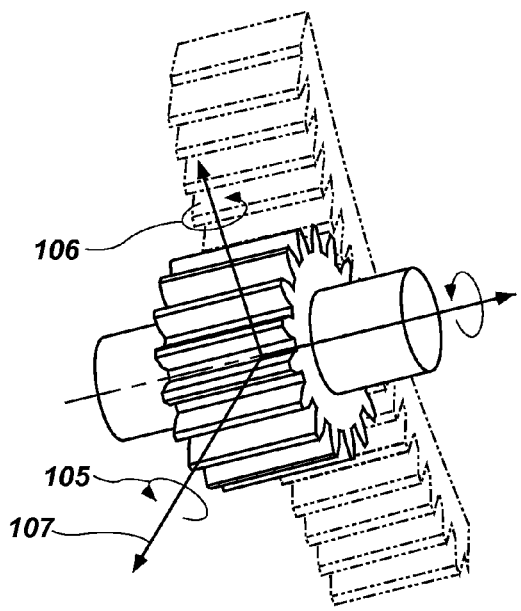
FIG. 3 illustrates adjustment degrees of freedom for an adjustable drive mechanism.

With reference to FIGS. 1 and 2, the adjustable drive mechanism 100 can engage with the driven gear 151 of the telescope or antenna 150. The adjustable drive mechanism 100 can include a base plate 110 configured to couple with a support structure 104 of the telescope or antenna 150, and a gear box 120. The gear box 120 can have a pinion gear 121 to interface with the driven gear 151 of the telescope or antenna 150, and a housing 122 in support of the pinion gear 121. As described further hereinafter, the adjustable drive mechanism 100 can facilitate alignment and positioning of the pinion gear 121 relative to the driven gear 151 in the degrees of freedom illustrated in FIG. 3. Of particular significance are adjustments in the helix 105, taper 106, and radius 107 degrees of freedom. For example, backlash can be affected by an adjustment in the radius 107 degree of freedom, and parallelism can be affected by an adjustment in the helix 105 and/or the taper 106 degrees of freedom.

Also shown in FIG. 2 is a second adjustable drive mechanism 100', which can be similar to the adjustable drive mechanism 100. In the embodiment illustrated, one of the adjustable drive mechanisms 100, 100' can serve as the master drive and the other of the adjustable drive mechanisms can serve as a bias, or anti-backlash, drive. The bias or anti-backlash drive can provide a counter force to the driven gear 151 against the master drive to eliminate gear backlash and improve pointing accuracy of the telescope or antenna 150.

Figure 4:
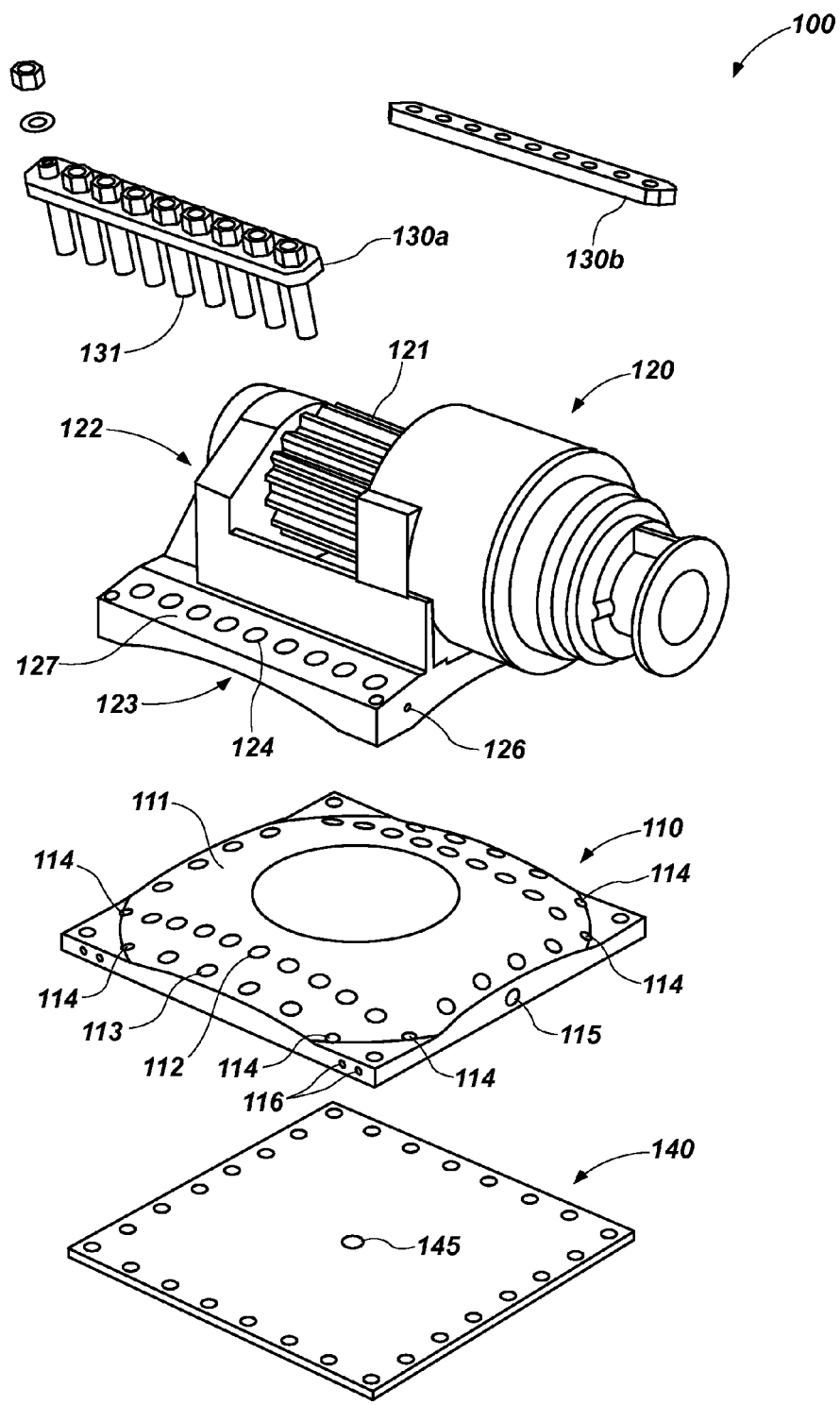
FIG. 4 is an exploded view of the adjustable drive mechanism of FIG. 1.

With reference to FIGS. 2 and 4, the base plate 110 can have a spherical portion 111. In one aspect, the spherical portion 111 can be configured to face away from the support structure 104. In addition, the housing 122 can have a spherical portion 123 configured to interface with the spherical portion 111 of the base plate 110. Thus, the spherical portion 111 and the spherical portion 123 can be movable relative to one another in three rotational degrees of freedom to facilitate alignment and positioning of the pinion gear 121 relative to the driven gear 151, such as in the helix 105, taper 106, and radius 107 degrees of freedom. The spherical portions 111, 123 can provide a single, large interface that can enable a rigid structural connection of the gear box 120 to the base plate 110, thus providing a direct, rigid structural path for gear loads to the support structure 104. In one aspect, the spherical portion 111 can comprise a convex spherical surface and the spherical portion 123 can comprise a mating concave spherical surface. The specific spherical geometry used can be configured to provide the travel or range of motion sufficient to make the necessary adjustments. In contrast to typical adjustment structures and procedures, no shimming is required.

The adjustable drive mechanism 100 can also include a clamping plate 130a, 130b configured to interface with the housing 122 and receive fasteners 131, such as a bolt, a threaded rod, and/or a nut, to secure the gear box 120 to the base plate 110. The housing 122 can have through-holes 124 formed therein configured to receive the fasteners 131. In addition, the base plate 110 can have gearbox fastening holes 112 formed therein, which may be threaded, configured to receive the fasteners 131 for securing the gear box 120 to the base plate 110. The gearbox fastening holes 112 can be blind or through-holes. In one aspect, the through-holes 124 can be sized to facilitate movement of the housing 122 about the fasteners 131 to facilitate relative movement of the spherical portions 111, 123 for adjustments. In other words, the holes 124 can be sufficiently oversized compared to the fasteners 131 to enable a suitable range of motion of the housing 122 about the base plate 110 in three rotational degrees of freedom when the fasteners 131 extend through the holes 124. This way, the fasteners 131 can be loose enough to permit movement of the gear box 120 relative to the base plate 110 while enabling the gear box 120 to be secured to the base plate 110 with minimal manipulation of the fasteners once a proper alignment has been achieved. Thus, in one aspect, the housing 122 can be secured to the base plate 110 by friction at the interface of the spherical portions 111, 123, which can be developed by torqueing the fasteners to generate a suitable preload. Such a connection can eliminate any welds or blocking as typically used to keep a gearbox from shifting and spoiling the alignment. Eliminating welds can be beneficial for alignment in that distortion due to welding, alone, can ruin the alignment.

Figure 5:
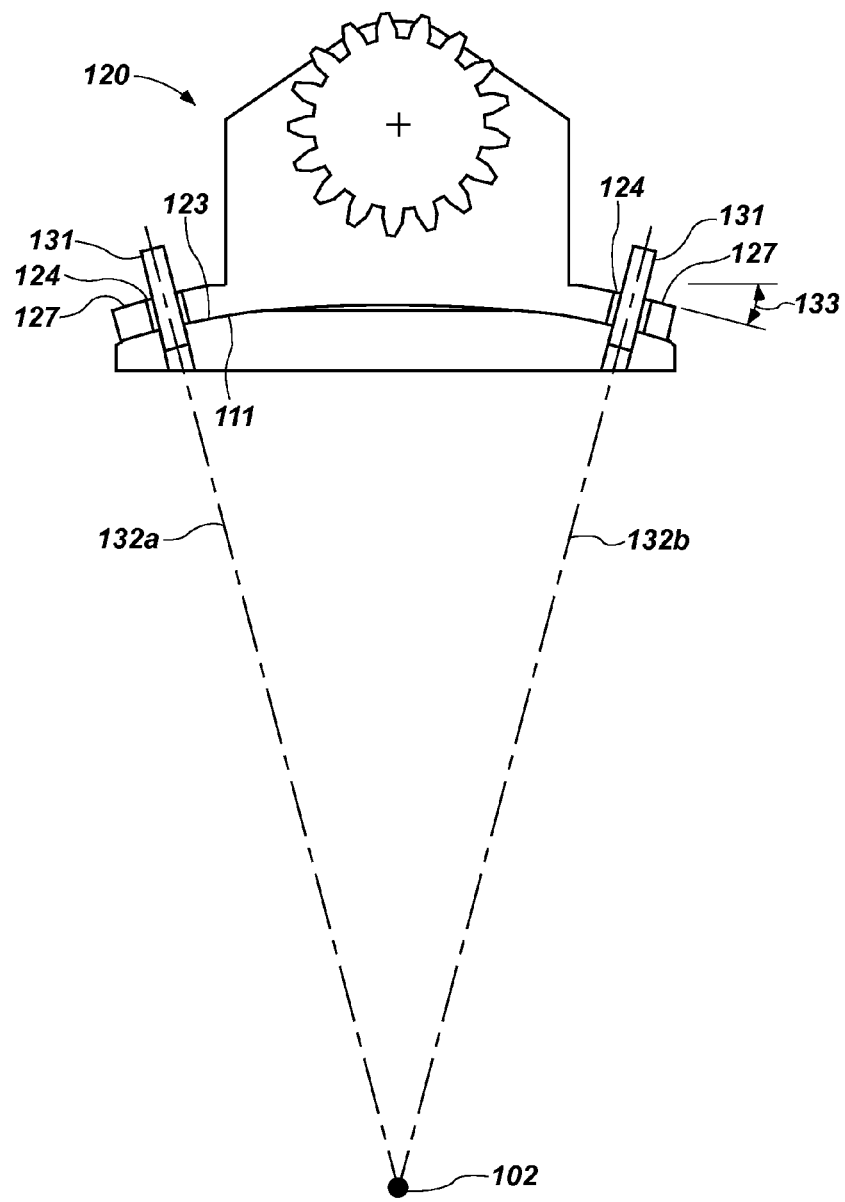
FIG. 5 is a cross-sectional view of the adjustable drive mechanism of FIG. 1.

With reference to FIG. 5, and continued reference to FIGS. 2 and 4, at least some of the fasteners 131 (due to coupling with a gearbox fastening hole 112) and/or the through-holes 124 can have an axis 132a, 132b that intersects an axis (into the page) extending through a center 102 of a sphere that defines the first and/or second spherical portions 111, 123. Further, at least one of the fasteners 131 and/or the holes 124 can intersect the center 102 of the sphere that defines the first and/or second spherical portions 111, 123. In one aspect, the center through-hole 124 on either side of the housing 122 can establish a basis for forming an interface surface 127 on the housing 122 for the clamping plate 130a, 130b. For example, the interface surface 127 can be planar and oriented at an angle 133 from horizontal, which is perpendicular to the axis 132a, 132b. The interface surface 127 can therefore provide a stable surface for interfacing with the clamping plate 130a, 130b. The angle 133 can vary depending on factors such as the diameter of the sphere, and the distance between the fasteners 131 (due to gearbox fastening hole 112) and the through-holes 124.

As shown in FIGS. 2 and 4, the base plate 110 can be configured to be coupled to the support structure 104 with fasteners, such as by utilizing holes 113. In some embodiments, a foundation or fixed shim plate 140 can be included and can be disposed between the base plate 110 and the support structure 104. Base plate adjustment features, such as holes 114 in the base plate 110, can be configured to accommodate jackscrews to facilitate leveling of the base plate 110 and/or alignment of the base plate 110 off of the support structure 104 and/or the foundation plate 140. In one aspect, a structural grout can be used between the support structure 104 and the base plate 110 and/or the foundation plate 140. The foundation or fixed shim plate 140 can be used to facilitate a future coarse adjustment of backlash. For example, if a replacement of the pinion gear is required, and the new pinion gear has a substantially different tooth thickness, a foundation or fixed shim plate of different thickness from the original plate can be substituted to compensate, obviating grout replacement.

Figure 6:
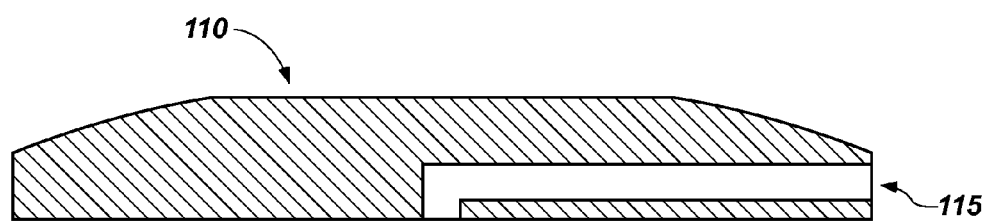
FIG. 6 is a cross-sectional view of illustrating a grout installation feature of a base plate of the adjustable drive mechanism of FIG. 1.

As shown in FIGS. 4 and 6, the base plate 110 can include a grout installation feature 115. The grout installation feature 115 can be configured to deliver grout to an underside of the base plate 110 and/or the foundation plate 140 when the base plate 110 is in place and the underside is otherwise not accessible. For example, the grout installation feature can comprise a conduit or passageway fluidly connecting an accessible area of the base plate 110 to a bottom of the base plate 110 and/or a bottom of the foundation plate 140 (via hole 145). Dams or temporary walls (not shown) can be located at the base plate perimeter to confine and form the grout when it is still a liquid. Jackscrews operable with the holes 114 in the base plate 110 can facilitate grout gap control between the support structure 104 and the base plate 110 and/or the foundation plate 140 as well as for adjusting alignment as the grout cures.

In one aspect, relative motion between the gear box 120 and the base plate 110 for adjustments can be obtained by utilizing turnbuckles. For example, a turnbuckle can be coupled to the base plate 110 and the gear box 120 via holes 116 in the base plate 110 and holes 126 in the housing 122. Any suitable number and or location of turnbuckles can be utilized, such as a turnbuckle at each corner of the base plate 110 and the housing 122. Precise control of relative movements can be obtained by utilizing one or more dial indicators. For example, a dial indicator can be fixed relative to the support structure 104 (assuming the base plate 110 is also fixed relative to the support structure 104) and can be in contact with a portion of the gear box 120 to measure movement of the gear box 120 with respect to the base plate 110. Any suitable number and or location of dial indicators can be utilized, such as one or more dial indicators at three corners of the housing 122.

Thus, as described herein, the adjustable drive mechanism 100 can utilize a spherical mounting interface to facilitate movement in at least three degrees of freedom between the mating gear teeth of the pinion gear 121 and the driven gear 151. In one aspect, the teeth can "self-align" by allowing the pinion gear 121 to move freely as the spherical portions 111, 123 move relative to one another.

Figure 7A:
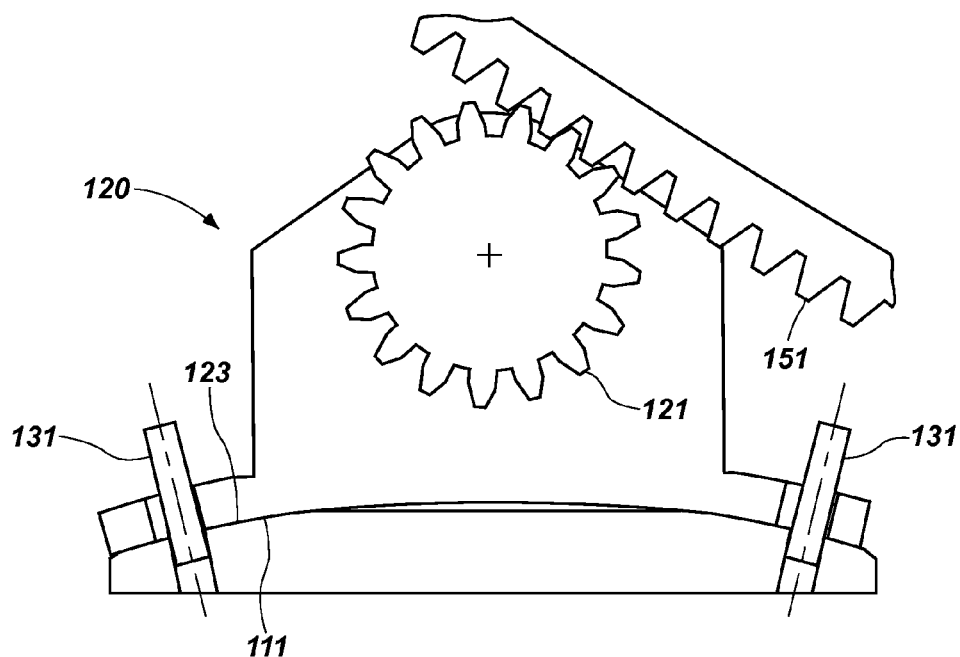
FIGS. 7A-7C illustrate a position and/or orientation adjustment of the adjustable drive mechanism of FIG. 1, in accordance with an example of the present disclosure.
Figure 7B:
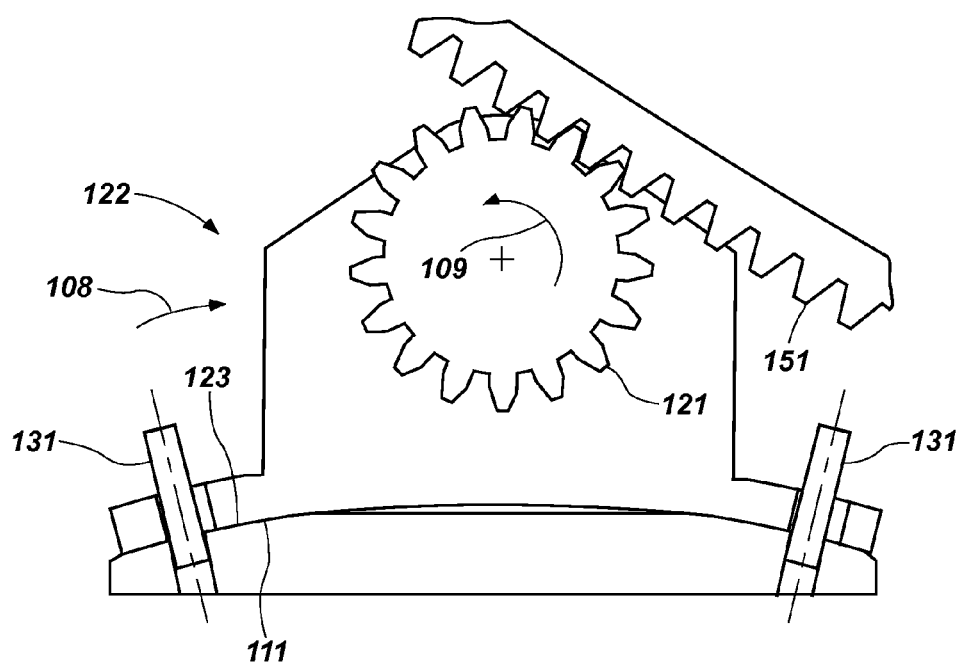
Figure 7C:
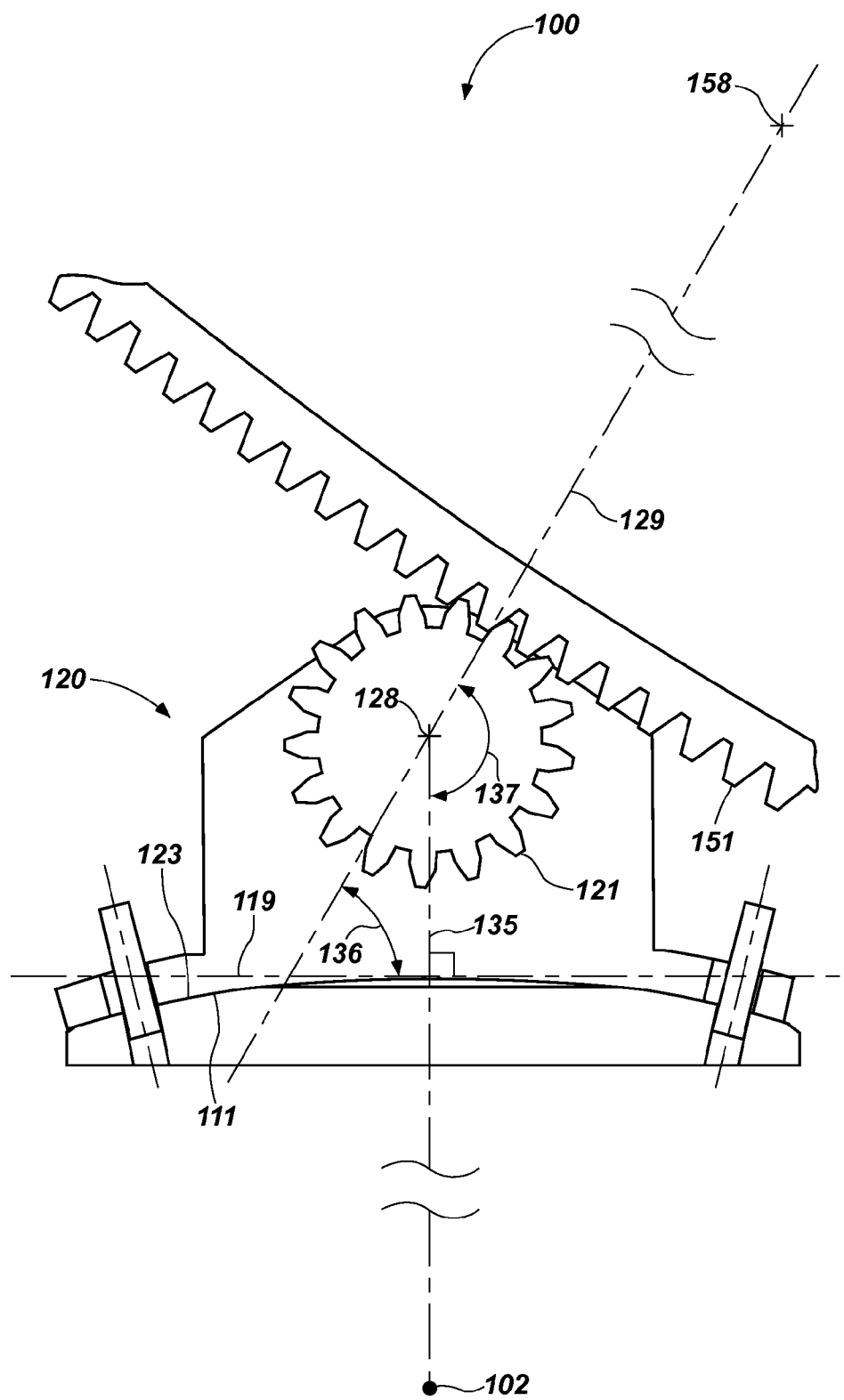

With reference to FIGS. 7A-7C, and further reference to FIGS. 1-6, a position and/or orientation adjustment of the adjustable drive mechanism 100 is illustrated. As shown in FIG. 7A, the gear box 120 can be disposed on the base plate 110 such that the pinion gear 121 is in close proximity to the driven gear 151. As shown in FIG. 7B, the spherical portions 111, 123 can facilitate self-alignment of the mating gear teeth of the pinion gear 121 with the driven gear 151. For example, by simply sliding the housing 122 in direction 108, such as by rotating the pinion gear 121 in direction 109, the pinion gear 121 can be caused to engage and "move into" the mating driven gear 151, self-aligning the gear teeth of the pinion gear 121 and the driven gear 151. Thus, backlash and parallelism gear alignments in the helix, taper, and radius degrees of freedom can be adjusted via the single, spherical interface provided by the spherical portions 111, 123. Accordingly, precise gear alignments can be achieved without the time consuming and expensive practice of utilizing permanent shims under the base plate 110 or re-machining teeth of the gears 151, 121.

In one aspect, gear backlash can be set by inserting a temporary shim or feeler gauge between the mating pinion and driven gears 121, 151, driving the gears into a tight mesh, and securing the housing 122 to the base plate 110 with fasteners 131. This can be done to set an initial backlash at the tightest location on the driven gear 151, with pattern checks performed over the full driven gear 151. Subsequent fine-adjustments to alignment, such as to backlash and/or parallelism of the gear teeth, can be made without disassembly. For example, by simply loosening the fasteners 131, small shifts or adjustments to the relative positions of the housing 122 and the base plate 110 can be made. In one aspect, increased precision in the adjustments can be obtained by utilizing turnbuckles coupled to the housing 122 under dial-indicator control.

As illustrated in FIG. 7C, the adjustable drive mechanism 100 can be configured to enhance or improve adjustability of gear backlash. For example, an axis 128 of the pinion gear 121 and an axis 158 of the driven gear 151 can be parallel and, therefore, can define a "gear plane" 129. In addition, the axis 128 of the pinion gear 121 and the center 102 of the sphere that defines the first and/or second spherical portions 111, 123 can define a line 135 perpendicular to the axis 128. A "sphere plane" 119 can be defined perpendicular to the line 135, here illustrated tangent to a "tip" of the spherical interface provided by the spherical portions 111, 123. As an angle 136 between the sphere plane 119 and the gear plane 129 decreases such that the sphere and gear planes 119, 129 become "more parallel" to one another, the ability to adjust backlash is improved. Thus, smaller angles 136 provide more backlash change for a given relative movement of first and second spherical portions 111, 123 than larger angles 136. As illustrated, the angle 136 is about 60 degrees, which provides about 50% effectiveness of movements for backlash adjustment. In the ideal condition where the angle 136 is 0 degrees and the sphere and gear planes 119, 129 are parallel, a movement to adjust backlash is 100% effective. In other words, in the ideal condition, the sphere and gear planes 119, 129 are parallel to direction 107 illustrated in FIG. 3, such that all movement of the pinion gear 121 toward or away from the driven gear 151 is effective to adjust backlash with no component of movement in another direction. The ideal condition can also be met when an angle 137 between the gear plane 129 and the line 135 is 90 degrees. In some embodiments, it may not be feasible to achieve parallel sphere and gear planes 119, 129. In such cases, the angle 136 between the sphere and gear planes 119, 129 can be minimized to provide optimum backlash adjustment performance under the circumstances or constraints.

Figure 8:
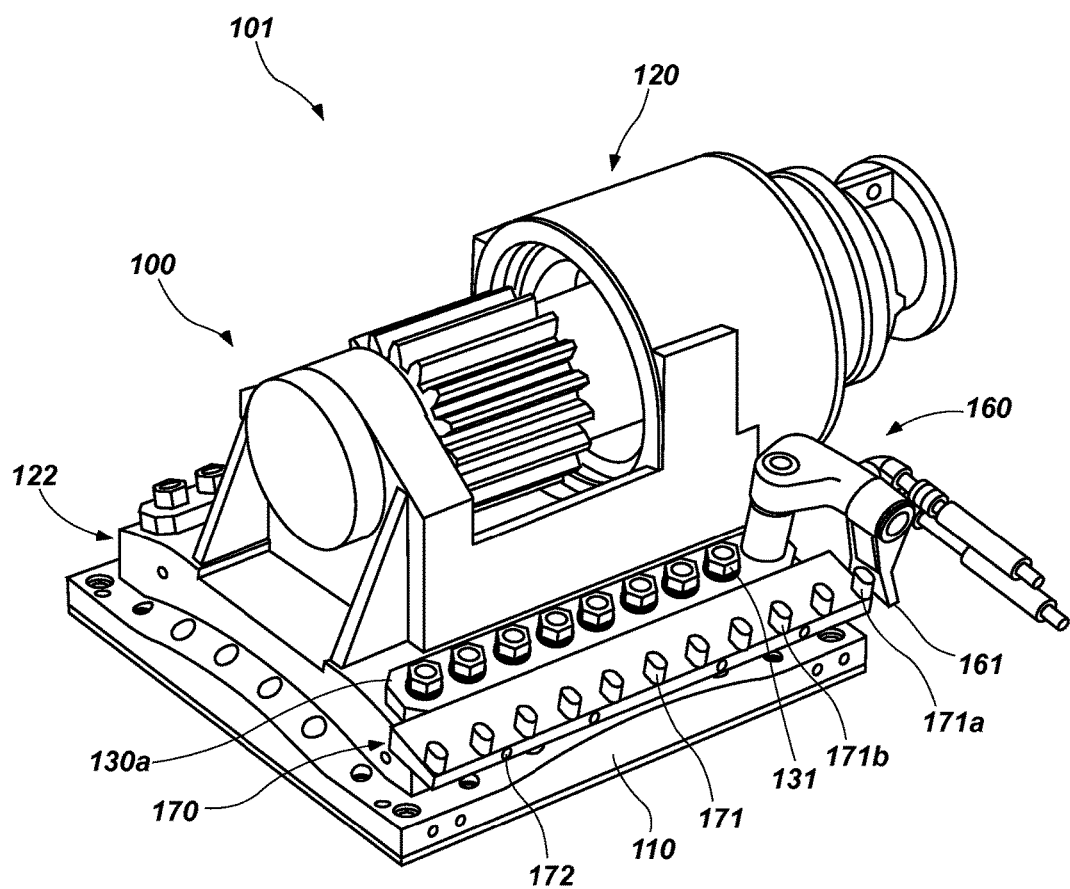
FIG. 8 is an example illustration of an adjustable drive mechanism securing system for a telescope or antenna, in accordance with an example of the present disclosure.

With reference to FIG. 8 and further reference to FIGS. 1-7C, an adjustable drive mechanism securing system 101 for a telescope or antenna 150 is illustrated. The securing system 101 can include an adjustable drive mechanism 100, as disclosed hereinabove. The securing system illustrates how the gear box 120 can be secured to the base plate 110 with fasteners 131. In one aspect, the securing system can include a hydraulic or pneumatic wrench 160 to apply a torque to the fasteners 131, such as to alternately secure and release the gear box 120 and the base plate 110 for adjustments and fine tuning. The securing system 101 can also include a torque reaction tool 170 operable with the adjustable drive mechanism 100 and the wrench 160 to react the torque applied by the wrench 160.

In one aspect, the torque reaction tool 170 can include tabs, generally referred to by reference number 171, configured to interface with an extension member 161 of the wrench 160 to react the torque applied by the wrench 160. Such reaction points on the reaction tool 170 can provide a compact, quick, and safe means of applying high torque loads to tighten the fasteners 131 that secure the housing 122 to the base plate 110. As shown in FIG. 8, the torque reaction tool 170 can have a tab 171 associated with each fastener, such that each tab is positioned to interface with the extension member 161 when the wrench 160 is tightening a given fastener. For example, the tab 171a shown engaged by the extension member 161 can facilitate tightening the fastener at an end of the clamping plate 130a. In another aspect, tabs 171 of the torque reaction tool 170 can be configured to facilitate reaction of a torque tending to loosen the fasteners 131. For example, the tab 171b can be configured to engage the extension member 161 of the wrench 160 to facilitate loosening the fastener at the end of the clamping plate 130a. In some cases, the same tab can facilitate tightening and loosening of the same or a different fastener, depending upon the particular configuration or arrangement of the fasteners and the tabs. The fasteners 131 can be tightened in any suitable sequence, such as beginning at a middle fastener on each side of the housing 122 and working outward in each direction.

In one aspect, the torque reaction tool 170 can be a temporary tool used only at assembly or disassembly. For example, the torque reaction tool and the clamping plate 130a can be configured to couple with one another, such as utilizing a fastener extending through a hole 172 in the torque reaction tool and extending into a corresponding threaded hole in the clamping plate 130a.

In accordance with one embodiment of the present invention, a method for facilitating alignment and positioning of an adjustable drive mechanism for a telescope or antenna is disclosed. The method can comprise providing an adjustable drive mechanism including a base plate configured to couple with a support structure, and a gear box having a pinion gear to interface with a driven gear of a telescope or antenna. Additionally, the method can comprise facilitating alignment and positioning of the pinion gear relative to the driven gear, wherein the base plate has a first spherical interface portion facing away from the support structure, and the gear box has a housing in support of the pinion gear and includes a second spherical portion configured to interface with the first spherical portion of the base plate, and wherein the first spherical portion and the second spherical portion are movable relative to one another in three rotational degrees of freedom. It is noted that no specific order is required in this method, though generally in one embodiment, these method steps can be carried out sequentially.

In one aspect, the method can further comprise facilitating fixing a position of the first spherical portion and the second spherical portion. In a specific aspect, facilitating fixing a position can comprise providing a clamping plate configured to interface with the housing and receive a plurality of fasteners.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An adjustable drive mechanism, comprising:
   a base plate configured to couple with a support structure and having a first spherical portion facing away from the support structure;
   a gear box having a pinion gear operable to interface with a driven gear, and a housing in support of the pinion gear and including a second spherical portion configured to interface with the first spherical portion of the base plate;
   a clamping plate configured to interface with the housing and to facilitate securing of the gear box to the base plate,
   wherein the first spherical portion and the second spherical portion are movable relative to one another in three rotational degrees of freedom to facilitate alignment and positioning of the pinion gear relative to the driven gear, and
   wherein the housing comprises a plurality of through-holes sized to facilitate movement of the housing and to facilitate relative movement of the first spherical portion and the second spherical portion.

2. The adjustable drive mechanism of claim 1, wherein the clamping plate is configured to receive a plurality of fasteners to secure the gear box to the base plate.

3. The adjustable drive mechanism of claim 2, wherein the plurality of through-holes are configured to receive the plurality of fasteners therethrough, the plurality of through-holes being sized to facilitate movement of the housing about the plurality of fasteners.

4. The adjustable drive mechanism of claim 3, wherein an axis of at least one of the plurality of through-holes intersects an axis extending through a center of a sphere defining the second spherical portion.

5. The adjustable drive mechanism of claim 4, wherein an interface surface for the clamping plate is perpendicular to the axis of at least one of the plurality of through-holes.

6. The adjustable drive mechanism of claim 2, wherein the base plate comprises a plurality of gearbox fastening holes configured to receive the plurality of fasteners.

7. The adjustable drive mechanism of claim 6, wherein an axis of at least one of the plurality of gearbox fastening holes intersects an axis extending through a center of a sphere defining the first spherical portion.

8. The adjustable drive mechanism of claim 2, wherein the clamping plate is configured to couple with a torque reaction tool operable to react a torque applied by a hydraulic or pneumatic wrench to the plurality of fasteners.

9. The adjustable drive mechanism of claim 8, wherein the clamping plate is securable to the torque reaction tool.

10. The adjustable drive mechanism of claim 1, wherein the first spherical portion comprises a convex spherical surface and the second spherical portion comprises a concave spherical surface.

11. The adjustable drive mechanism of claim 1, wherein the base plate comprises a base plate adjustment feature to facilitate leveling or alignment of base plate relative to the support structure.

12. The adjustable drive mechanism of claim 1, wherein the adjustable drive mechanism is configured to minimize an angle between a sphere plane and a gear plane, the sphere plane defined by the interface between the first and second spherical portions, and the gear plane defined by an axis of the pinion gear and an axis of the driven gear.

13. An adjustable drive mechanism securing system, comprising:
   an adjustable drive mechanism comprising
      a base plate configured to couple with a support structure and having a first spherical portion facing away from the support structure, and
      a gear box having a pinion gear to interface with a driven gear, and a housing in support of the pinion gear and including a second spherical portion configured to interface with the first spherical portion of the base plate,
      wherein the first spherical portion and the second spherical portion are movable relative to one another in three rotational degrees of freedom to facilitate alignment and positioning of the pinion gear relative to the driven gear, and
      wherein the gear box is secured to the base plate with a plurality of fasteners;
   a hydraulic or pneumatic wrench to apply a torque to the plurality of fasteners to alternately secure and release the gear box and the base plate; and
   a torque reaction tool comprising a plurality of tabs configured to interface with an extension member of the wrench, the torque reaction tool being operable with the adjustable drive mechanism and the wrench to react the torque applied by the wrench.

14. The system of claim 13, wherein the adjustable drive mechanism further comprises a clamping plate configured to interface with the housing and receive the plurality of fasteners to secure the gear box to the base plate.

15. The system of claim 14, wherein the clamping plate is configured to couple with the torque reaction tool.

16. The system of claim 15, wherein the clamping plate is secured to the torque reaction tool.

17. The system of claim 13, wherein the housing comprises a plurality of through-holes configured to receive the plurality of fasteners therethrough, the plurality of through-holes being sized to facilitate movement of the housing about the plurality of fasteners to facilitate relative movement of the first spherical portion and the second spherical portion.

18. A method for facilitating alignment and positioning of an adjustable drive mechanism, comprising:
   providing an adjustable a drive mechanism including
      a base plate configured to couple with a support structure,
      a gear box having a pinion gear to interface with a driven gear of a telescope or antenna,
      a clamping plate configured to facilitate securing of the gear box to the base plate; and
   facilitating alignment and positioning of the pinion gear relative to the driven gear,
   wherein the base plate has a first spherical portion facing away from the support structure, and the gear box has a housing in support of the pinion gear and includes a second spherical portion configured to interface with the first spherical portion of the base plate, the clamping plate interfacing with the housing,
   wherein the first spherical portion and the second spherical portion are movable relative to one another in three rotational degrees of freedom, and
   wherein the housing comprises a plurality of through-holes sized to facilitate movement of the housing and to facilitate relative movement of the first spherical portion and the second spherical portion.

* * * * *